United States Patent [19]

Uchiyama

[11] 4,280,750
[45] Jul. 28, 1981

[54] BINOCULAR'S FOCUS OR ZOOM ADJUSTING KNOB

[75] Inventor: Mutsuo Uchiyama, Nihonbashi, Japan

[73] Assignee: Hilka International Co., Ltd., Nihonbashi, Japan

[21] Appl. No.: 10,254

[22] Filed: Feb. 7, 1979

[30] Foreign Application Priority Data

Sep. 11, 1978 [JP] Japan .......................... 53-123607[U]

[51] Int. Cl.³ .............................................. G02B 7/06
[52] U.S. Cl. ....................................... 350/76; 350/40; 350/41; 350/46
[58] Field of Search ....................... 350/40, 41, 42, 43, 350/44, 46, 47, 74, 75, 76, 77

[56] References Cited

U.S. PATENT DOCUMENTS

| 4,066,329 | 1/1978 | Van Exel ................... 350/77 |
| 4,126,374 | 11/1978 | Maguire ............... 350/77 X |
| 4,171,865 | 10/1979 | Kamakura ............... 350/41 |

*Primary Examiner*—John K. Corbin
*Assistant Examiner*—Matthew W. Koren
*Attorney, Agent, or Firm*—Thomas R. Morrison

[57] ABSTRACT

This invention relates to a binocular's focus or zoom adjusting knob having a pair of generally flattened platforms and a pair of upwardly projected members adjacent the flattened platforms so as to be easily contacted by a user's fingertips. The above adjusting knob motion is driven in a seesaw motion. Thus, a smooth focus or zoom adjustment is obtained.

4 Claims, 15 Drawing Figures

BINOCULAR'S FOCUS OR ZOOM ADJUSTING KNOB

BACKGROUND OF THE INVENTION

The present invention relates to improvements in or relating to a binocular's focus or zoom adjusting knob.

For instance, according to U.S. Pat. No. 4,066,329, as shown schematically in FIG. 1 a focus adjusting knob 5 has a pair of generally flattened platforms 4, 4' arranged to be contacted by the fingers of a user's hands. This known binocular includes a pair of telescopes 3, 3' which are linked with each other by way of arms 2, 2 and are rotatable along a center shaft 1. And the focus adjusting knob 5 is coupled to a pair of ocular lenses 6, 6' through cam means 8 for rapid, short-stroke focus adjustment. The focus adjusting knob 5 is a unique structure in view of its flattened surface. The focus adjusting knob 5 is moved in a treadle or seesaw way with the user's fingers, thereby a smooth focus adjustment is obtained.

When a person who has a narrow interpupillary space between his or her two eyes uses the binocular of the above structure, the position of the adjusting knob 5 becomes higher in relation to the two telescopes 3, 3' as shown in FIG. 1c. In this case, the flattened platforms 4, 4' are contacted by the fingers, thereby the adjusting knob being operable.

On the other hand, for a person who has a wider interpupillary space, the position of the adjusting knob 5 becomes relatively lower in relation to the top surface of the two telescopes 3, 3' as shown in FIG. 1b. As a result, it becomes not easy to press the two platforms 4, 4'. Namely, the two platforms 4, 4' must be contacted by the fingers in such a manner as to force them downwardly from the top surface of the two platforms 4, 4'. In other words, the fingertips are obliged to be extended to them, so that it is not easy to press them smoothly. In view of the above inconvenience, the present invention has been achieved.

BRIEF SUMMARY OF THE INVENTION

Accordingly, it is a general object of this invention to provide a binocular's focus or zoom adjusting knob which is easily contacted and smoothly operable by the user's fingertips irrespective of his or her interpupillary space and finger length.

According to a binocular of this invention having a pair of telescopes fixed with arms disposed transversely in relation to a center shaft, a focus or zoom adjusting knob comprises a pair o generally flattened platforms and a pair of upwardly projected members adjacent the flattened platforms so as to be easily contacted by a user's fingertips, the focus or zoom adjusting knob being mounted on said center shaft.

Other objects and advantages of this invention will become apparent from the following description of embodiments with reference to the accompanying drawings.

BRIEF SUMMARY OF THE ACCOMPANYING DRAWINGS

DETAILED DESCRIPTION OF THE INVENTION

Preferred examples of this invention will now be described with reference to the accompanying drawings.

Figure 1A:
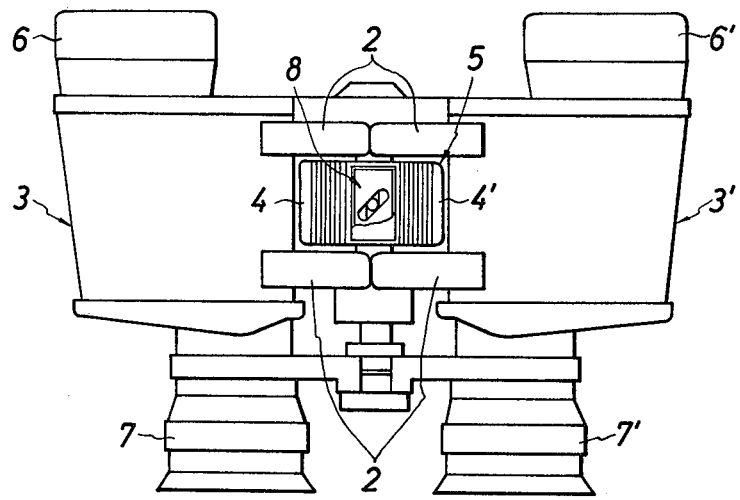
FIG. 1a is a plan view of a conventional binocular.
Figure 1B:
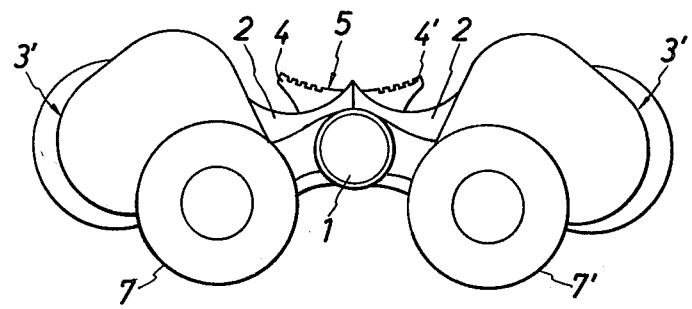
FIG. 1b is a front view thereof in use.
Figure 1C:
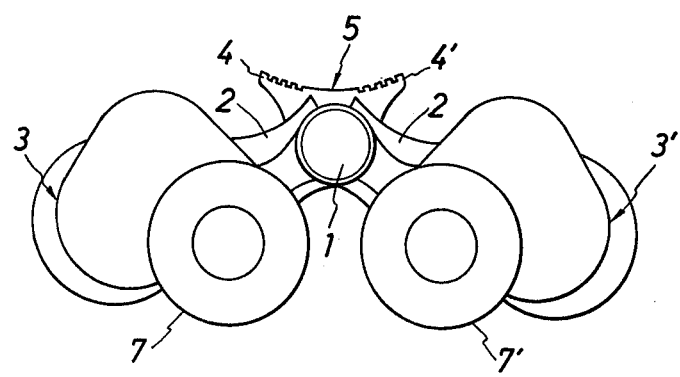
FIG. 1c is a front view thereof showing another form in use.
Figure 2A:
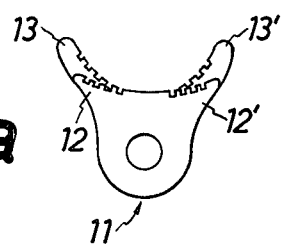
FIGS. 2a, 2b and 2c are respectively front, plan and perspective views showing the first example of a binocular's focus or zoom adjusting knob according to this invention.
Figure 2B:
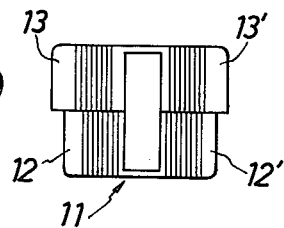
Figure 2C:
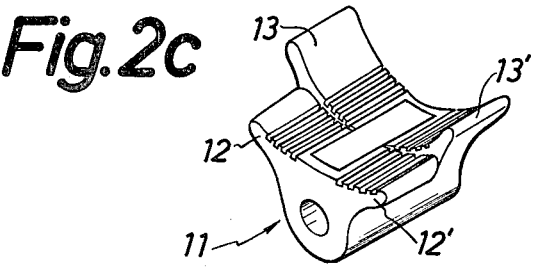

Referring to the first example (FIGS. 2a, 2b and 2c) of this invention, a focus or zoom adjusting knob 11 has a pair of platforms 12, 12' having a relatively flat upper surface and a pair of adjusting members 13, 13' thereadjacent integrally formed with platforms 12 and 12' and having ends. The pair of adjusting members 13, 13' are located at the side of a pair of objective lenses. Pairs of adjusting members (15, 15'), (19, 19') and (21, 21') which will be described herinafter are also located at the side of the two objective lenses. The pair of platforms 12, 12' are similar to or identical with the pair of platforms 4, 4' of the conventional binocular.

Figure 3A:
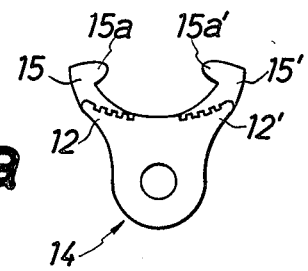
FIGS. 3a, 3b and 3c are respectively front, plan and perspective views showing the second example therof.
Figure 3B:
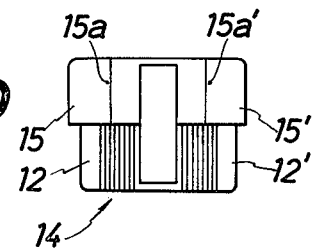
Figure 3C:
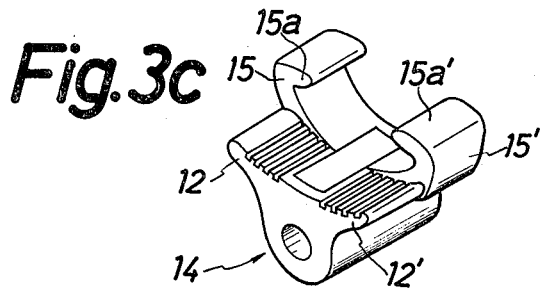

Referring to the second example (FIGS. 3a, 3b and 3c) of this invention, a focus or zoom adjusting knob 14 has a pair of platforms 12, 12' having a relatively flat upper surface and a pair of adjusting members 15, 15' thereadjacent integrally formed with platforms 12 and 14' and having ends which project substantially upwardly and further provided with a pair of hook-shaped projections 15a, 15a'. As a whole, each of the adjusting members 15, 15' are of a V-shape.

Referring to the third example (FIGS. 4a, 4b and 4c) of this invention, a focus or zoom adjusting knob 16 is to improve the first example furthermore. The adjusting knob 16 has a pair of platforms 17, 17' having a substantially flat upper surface and a pair of adjusting members 19, 19' thereadjacent having ends which project substantially upwardly. So that a pair of adjusting members 19, 19' can be rotated, a pair of pins 18, 18' are mounted within the platforms 17, 17' as well as the adjusting members 19, 19'. The arrangement of the adjusting members 19, 19' is such that they can be rotated by way of each of the pins 18, 18'. In this case, the first half part of the pin 18 can be fixed with the adjusting member 19 and the second half part thereof is free within the platform 17. Alternatively, the first half part of the pin 18 is free within the adjusting member 19 and the second part thereof is fixed with the platform 17. Alternatively, the pin 18 can be free within both the adjusting member 19 and the platform 17, provided that the pin can be firmly retained within the adjusting member 19 and the platform 17.

Figure 4A:
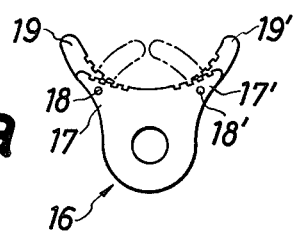
FIGS. 4a, 4b and 4c are respectively front, plan and perspective views showing the third example therof.
Figure 5A:
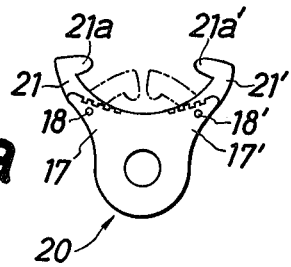
FIGS. 5a, 5b and 5c are respectively front, plan and perspective views showing the fourth example thereof.
Figure 4B:
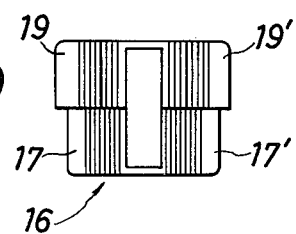
Figure 4C:
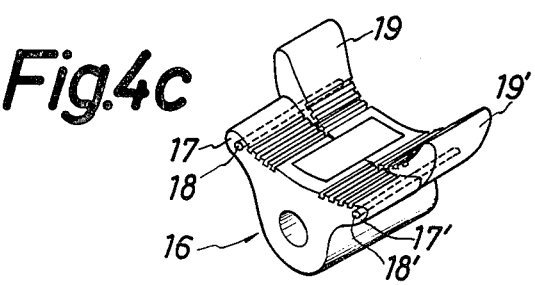

In this way, the adjusting member 19 can be folded by way of the pin 19 as shown by a dotted line (FIG. 4a). This folding pattern is identical with the fourth example (FIG. 5a) which will be described hereinafter.

Figure 5B:
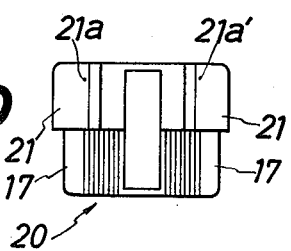
Figure 5C:
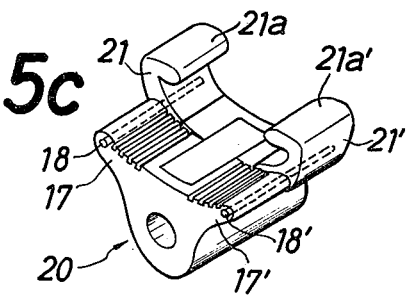

Referring to the fourth example (FIGS. 5a, 5b and 5c) of this invention, a focus or zoom adjusting knob 20 has a pair of platforms 17, 17', having a substantially flat upper surface and a pair of adjusting members 21, 21' thereadjacent which are provided with a pair of upward-directed hook-shaped projections 21a, 21a'. Likewise, a pair of pins 18, 18' are mounted within the platforms 17, 17' as well as the adjusting members 21, 21'. The arrangement of the adjusting members 21, 21' is also that they can be rotated by way of the pins 18, 18'. The rotation and mounting of the pins 18, 18' in this example are the same as those in the third example.

The operation of the adjusting members 11, 14, 16 and 20 will now be described.

Since the platforms 12, 12' and 17, 17' are located at the side of a pair of ocular lenses and the adjusting members 13, 13', 15, 15', 19, 19' and 21, 21' are located at the side of a pair of objective lenses, the formers are contacted by the user's forefingers, while the latters are contacted by the middle fingers.

When the adjusting members 13, 13', 15, 15', 19, 19' and 21, 21' are disposed in a higher position, they can be pressed to a palm direction by the middle fingertips. As the position of the above adjusting members is gradually lowered, the platforms 12, 12' and 17, 17' can also be pressed by the forefingertips. Moreover, since the adjusting members 15, 15' and 21, 21' have the hook-shaped projections 15a, 15a' and 21a, 21a', they are much easier contacted by the fingertips.

It is to be understood that a binocular's focus or zoom adjusting knob according to this invention is moved in a treadle or seesaw motion, thereby a smooth focus or zoom adjustment being obtained.

Further, it is to be understood that the above focus or zoom adjusting knob is coupled to a pair of ocular lenses through cam means for rapid, short-stroke focus or zoom adjustment.

What is claimed is:

1. In a binocular having a pair of telescopes fixed with arms disposed transversely in relation to a center shaft, a focus or zoom adjusting knob comprising a pair of generally flattened platforms integrally formed with a pair of adjusting members having upwardly projected ends adjacent said flattened platforms so as to be easily contacted by a user's fingertips, said focus or zoom adjusting knob being mounted on said center shaft.

2. A binocular's focus or zoom adjusting knob claimed in claim 1, wherein said upwardly projected ends include a pair of hook-shaped projections.

3. A binocular of the type having a pair of telescopes having arms affixed thereto, a center shaft, said arms being connected to said center shaft, comprising:

a focus or zoom adjusting knob disposed on said center shaft;

a pair of generally flattened platforms on said zoom adjusting knob;

a pair of adjusting members adjacent said platforms;

said pair of adjusting members including upwardly projecting ends which can be easily contacted by a user's fingertips; and means for permitting independent rotation of each of said upwardly projecting ends with respect to said pair of platforms.

4. A binocular according to claim 3 wherein said upward projecting ends are hook shaped.

* * * * *